United States Patent
Lee et al.

(10) Patent No.: US 10,082,910 B2
(45) Date of Patent: Sep. 25, 2018

(54) GESTURE CELL AND GESTURE SENSOR HAVING A PHOTODIODE COMPRISING A FIRST LAYER FORMED AS A SERPENTINE ELEMENT ON A SUBSTRATE

(71) Applicant: Magnachip Semiconductor, Ltd., Cheongju-si (KR)

(72) Inventors: Yongsup Lee, Cheongju-si (KR); Daeho Lim, Cheongju-si (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 603 days.

(21) Appl. No.: 14/500,072

(22) Filed: Sep. 29, 2014

(65) Prior Publication Data

US 2015/0115137 A1    Apr. 30, 2015

(30) Foreign Application Priority Data

Oct. 28, 2013    (KR) .......................... 10-2013-0128770

(51) Int. Cl.
| | |
|---|---|
| *G06F 3/042* | (2006.01) |
| *G01V 8/20* | (2006.01) |
| *G06F 3/01* | (2006.01) |
| *G06F 3/03* | (2006.01) |

(52) U.S. Cl.
CPC ................ *G06F 3/042* (2013.01); *G01V 8/20* (2013.01); *G06F 3/017* (2013.01); *G06F 3/0304* (2013.01); *G06F 2203/04108* (2013.01)

(58) Field of Classification Search
CPC ........ G06F 3/042; G06F 3/017; G06F 3/0304; G01V 8/20
See application file for complete search history.

(56) References Cited

U.S. PATENT DOCUMENTS

| | | | | |
|---|---|---|---|---|
| 2012/0280107 A1* | 11/2012 | Skurnik | ................ | G06F 3/0416 250/206.1 |
| 2012/0280904 A1 | 11/2012 | Skurnik et al. | | |
| 2014/0149764 A1* | 5/2014 | Gunther | .................... | G05F 1/56 713/320 |

* cited by examiner

Primary Examiner — Que T Le
(74) Attorney, Agent, or Firm — NSIP Law

(57) ABSTRACT

A gesture cell including a photodiode comprising a first layer, the first layer formed as a serpentine element on a substrate, and an optical blind configured to guide a light that is incident from a first direction on the photodiode, the optical blind being placed on the photodiode obliquely toward the first direction, wherein the serpentine element is continuously formed from multiple limbs positioned in the first directions and returning in a corresponding second direction, and each limb positioned in the first direction and the corresponding limb returning in the second direction are equally spaced apart.

19 Claims, 11 Drawing Sheets

GESTURE CELL AND GESTURE SENSOR HAVING A PHOTODIODE COMPRISING A FIRST LAYER FORMED AS A SERPENTINE ELEMENT ON A SUBSTRATE

CROSS-REFERENCE TO RELATED APPLICATIONS

This application claims the benefit under 35 USC § 119(a) of Korean Patent Application No. 10-2013-0128770 filed on Oct. 28, 2013, in the Korean Intellectual Property Office, the entire disclosure of which is incorporated herein by reference for all purposes.

BACKGROUND

1. Field

The following description relates to a gesture to a gesture cell and a gesture sensor including a single type photodiode and simplifying an optical blind structure to limit a light incident angle for a corresponding photodiode.

2. Description of Related Art

A gesture sensor (or a gesture detector) corresponds to a sensor using an infrared LED (Light Emitting Diode) and an infrared sensor to detect a direction of movement of an object.

Gesture sensor is used to control devices, such as, for example, a mobile device. The gesture sensor may be used for a variety of devices, such as, for example, mobile device, cellular phone, smart phone, wearable smart device (such as, for example, ring, watch, pair of glasses, bracelet, ankle bracket, belt, necklace, earring, headband, helmet, device embedded in the cloths or the like), personal computer (PC), server computers, smartphones, tablet personal computer (tablet), phablet, personal digital assistants (PDAs), digital camera, portable game console, MP3 player, portable/personal multimedia player (PMP), handheld e-book, ultra mobile personal computer (UMPC), portable lab-top PC, global positioning system (GPS) systems, television (TV), high definition television (HDTV), optical disc player, DVD player, Blue-ray player, setup box, content players, communication systems, image processing systems, graphics processing systems, laptop computers, tablet PCs, or any other consumer electronics/information technology (CE/IT) device. The gesture sensor operates a corresponding device or causes the corresponding device to perform a specific function according to a user's movement not a user's touch. The user's movement includes moving a user's hand or an object at a near distance from the corresponding device toward a specific direction.

The gesture sensor may also be integrated with an ambient sensor and a color sensor to be implemented as a single chip. The gesture sensor may modulate a brightness of the display of the device according to an ambient brightness or may adjust an image photographed by a camera according to an ambient color of a photographing place to be applied to various fields.

The U.S. Patent Application Publication No. 2012/0280107 (Nov. 8, 2012) and the U.S. Patent Application Publication No. 2012/0280904 (Nov. 8, 2012) disclose a conventional gesture sensor technique. All documents cited in the present disclosure, including published documents, patent applications, and patents, may be incorporated herein in their entirety by reference in the same manner as when each cited document is separately and specifically incorporated or incorporated in its entirety.

FIG. 1 is a diagram illustrating an example of a structure of a conventional gesture sensor. Referring to FIG. 1, a conventional gesture sensor 100 includes four photo sensors (i.e., A, B, C, D), a control circuit processing a signal that is output from the photo sensors and a LED light source periodically supplying light. When a light is emitted from the LED light source and an object moves over the LED light source, the light may collide with the object and a reflection light of the object may be generated. A lens may collect the reflection light and at least one of the four photo sensors may receive the collected light.

FIGS. 2A through 2C are diagrams illustrating examples of a conventional gesture sensor.

FIG. 2A illustrates an example of a cross sectional diagram of the conventional gesture sensor. Referring to FIG. 2A, the conventional gesture sensor 100 includes two gesture cells A and B. The two gesture cells A and B are spatially separated through a wall. The wall may determine a light direction that is incident on the conventional gesture sensor 100 and each of the two gesture cells A and B may detect left or right direction movement.

The wall is laid from a first metal layer to a top metal layer and each of metal layers is connected through a VIA. The conventional gesture sensor 100 includes a P+ isolation diffusion in a lower side of the wall to remove a noise photo current being generated between two gesture cells A and B.

FIGS. 2A and 2B illustrate examples of sectional diagrams for the conventional gesture sensor and the conventional gesture sensor 100 may include a segment integrating a plurality of gesture cells to detect a 4 way direction movement (i.e., left, right, up, or down).

The conventional gesture sensor 100 arrange independent gesture cells on both sides of the wall so that the conventional gesture sensor 100 may generate a noise current between the gesture cells and interference by the noise current. In order to solve these problems, the conventional gesture sensor 100 may further include an additional photodiode for removing the noise current on the lower side of the wall. However, a ratio of an area of the gesture cells in an area of the segment may be decreased so that an efficiency of the gesture sensor may be decreased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a gesture sensor that is more powerful when the gesture sensor is integrated with a color sensor and an ambient sensor.

In another general aspect, there is provided a gesture cell including a photodiode comprising a first layer, the first layer formed as a serpentine element on a substrate, and an optical blind configured to guide a light that is incident from a first direction on the photodiode, the optical blind being placed on the photodiode obliquely toward the first direction, wherein the serpentine element is continuously formed from multiple limbs positioned in the first directions and returning in a corresponding second direction, and each limb positioned in the first direction and the corresponding limb returning in the second direction are equally spaced apart.

The optical blind may include metal layers laid on top of each other in a staggered manner and the metal layers being spaced apart from each other.

Each of the metal layers may be continuously formed from multiple members positioned in the first directions and returning in a corresponding second direction, and each member positioned in the first direction and the corresponding member returning in the second direction are equally spaced apart forming a plane.

The metal layers may be independent from each other.

The optical blind may be obliquely arranged so that the optical blind covers not more than three fourths (75%) of an upper area of the first layer.

A via layer may be absent from the metal layers.

The first layer may include at least a P+ layer and a Deep N Well (DNW) layer.

In another general aspect, there is provided a gesture sensor including a plurality of gesture cells disposed on a surface to detect a movement of an object, wherein each gesture cell of the plurality of the gesture cells comprises a photodiode comprising a first layer, the first layer formed as a serpentine element on a substrate, and an optical blind configured to guide a light that is incident from a first direction on the photodiode, the optical blind being placed on the photodiode obliquely toward the first direction, and the serpentine element is continuously formed from multiple limbs positioned in the first directions and returning in a corresponding second direction, and each limb positioned in the first direction and the corresponding limb returning in the second direction are equally spaced apart.

The plurality of the gesture cells may include four gesture cells, each gesture cell being disposed toward a direction to detect movement of an object in the direction.

The four gesture cells may include a first gesture cell arranged on a center left side of the gesture sensor and the first gesture cell comprising the photodiode and a left-directed optical blind, a second gesture cell being arranged on a center right side of the gesture sensor and the second gesture cell comprising the photodiode and a right-directed optical blind, a third gesture cell being arranged on a lower center side of the gesture sensor and the third gesture cell comprising the photodiode and a lower-directed optical blind, and a fourth gesture cell being arranged on a upper center side of the gesture sensor and the fourth gesture cell comprising the photodiode and an upper-directed optical blind.

The gesture sensor may include four additional gesture cells, each additional gesture cell corresponding to one of the first through fourth gesture cells and detecting a movement of the object in an opposite direction as the corresponding first through fourth gesture cells.

The gesture sensor may include a fifth gesture cell disposed below the first gesture cell and the fifth gesture cell comprising the photodiode and a right-directed optical blind, a sixth gesture cell disposed below the second gesture cell and the sixth gesture cell comprising the photodiode and a left-directed optical blind, a seventh gesture cell disposed below the third gesture cell and the seventh gesture cell comprising the photodiode and an upper-directed optical blind, and an eighth gesture cell disposed below the fourth gesture cell and the eighth gesture cell comprising the photodiode and a lower-directed optical blind.

The plurality of the gesture cells may include a first and a second gesture cell disposed toward the first direction to detect movements of an object in two opposite directions, and a third and a fourth gesture cells disposed toward the second direction to detect movements of an object in two opposite directions, the first and second directions being perpendicular to each other.

The first gesture cell may be arranged on a center left side of the gesture sensor and the first gesture cell comprises the photodiode and a left-directed optical blind, the second gesture cell may be arranged on a center right side of the gesture sensor and the second gesture cell comprises the photodiode and a right-directed optical blind, and the third and fourth adjoining gesture cells may be arranged between the first and second gesture cells, each including photodiode and a lower-directed or an upper-directed optical blind.

The first through fourth gesture cells may form a pair with adjoining fifth through eighth gesture cells, each pair detecting opposite directions.

The gesture sensor may include a fifth gesture cell disposed below the first gesture cell and the fifth gesture cell comprising the photodiodes and right-directed optical blind, a sixth gesture cell disposed below the second gesture cell and sixth gesture cell comprising the photodiodes and left-directed optical blind, a seventh gesture cell arranged on a right side of the third gesture cell and the seventh gesture cell comprising the photodiodes and an upper-directed optical blind, and an eighth gesture cell arranged on a right side of the fourth gesture cell and the eighth gesture cell comprising the photodiodes and a lower-directed optical blind, and wherein the diagonal gesture cells detects movement of the object in the same direction.

The gesture sensor may be rotated counterclockwise to 90 degrees.

In another general aspect, there is provided a gesture sensor including a light sensor, and a first gesture cell, a second gesture cell, a third gesture cell, and a fourth gesture cell disposed in a direction around the light sensor to detect a movement of an object in the direction, wherein the first gesture cell is arranged on a center left side of the light sensor and the first gesture cell comprises a left-directed optical blind, the second gesture cell is arranged on a center right side of the light sensor and the second gesture cell comprises a right-directed optical blind, the third gesture cell is arranged on a lower center side of the light sensor and the third gesture cell comprises a lower-directed optical blind, and the fourth gesture cell is arranged on a upper center side of the light sensor and the fourth gesture cell comprises an upper-directed optical blind.

Each gesture cell may include a photodiode comprising a first layer, the first layer formed as a serpentine element on a substrate, an optical blind configured to guide a light that is incident from a first direction on the photodiode, the optical blind being placed on the photodiode obliquely toward the first direction, and the serpentine element is continuously formed from multiple limbs positioned in the first directions and returning in a corresponding second direction, and each limb positioned in the first direction and the corresponding limb returning in the second direction are equally spaced apart.

In one general aspect, a structure of a gesture sensor may be simplified through a single photodiode and an optical block arranged as a specific shape and may remove a noise current being generated between photodiodes to provide a high efficiency.

Improved performance may be obtained when the gesture sensor is integrated with a color sensor and an ambient sensor through various dispositions.

Other features and aspects will be apparent from the following detailed description, the drawings, and the claims.

Figure 1:
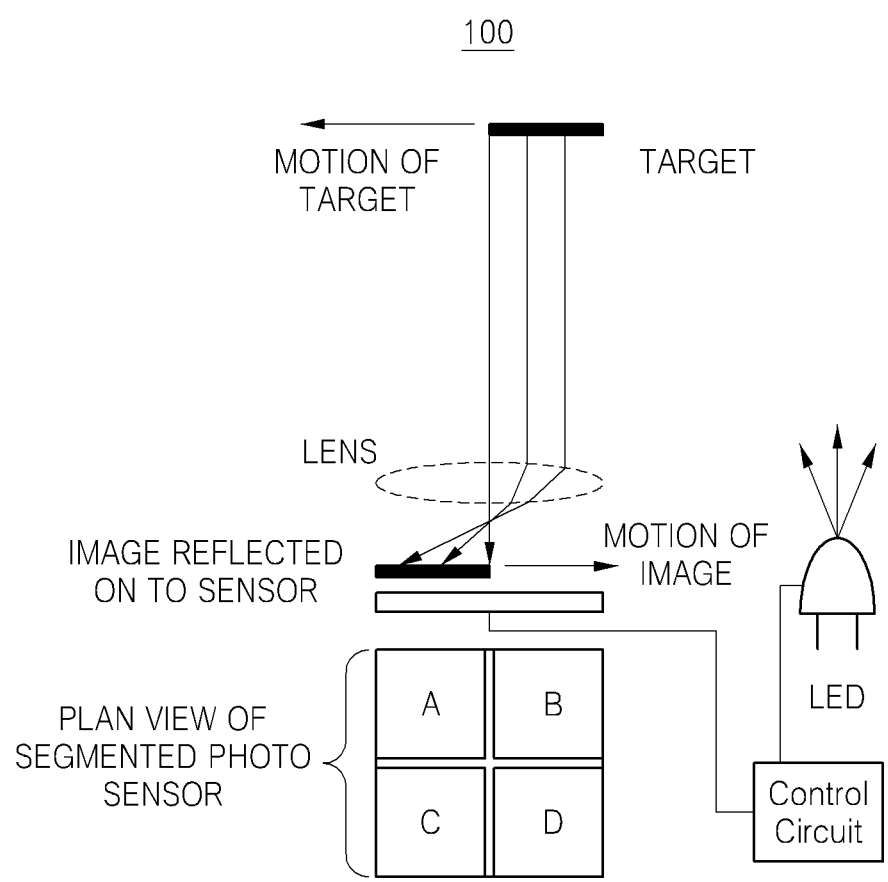
FIG. 1 is a diagram illustrating an example of a component for a conventional gesture sensor.
Figure 2A:
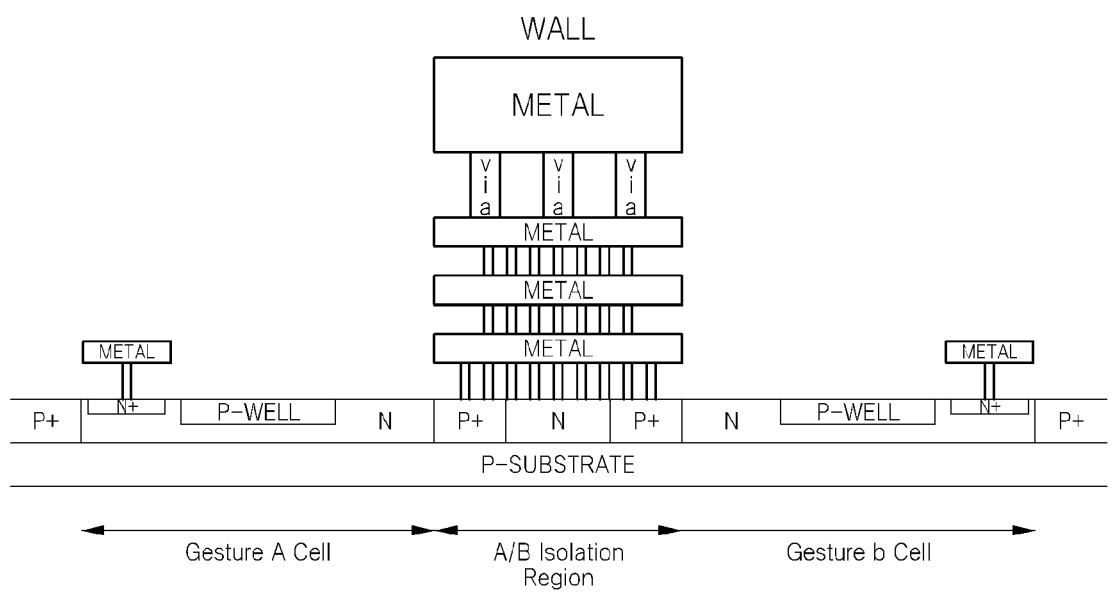
FIGS. 2A through 2C are diagrams illustrating examples of a structure for a conventional gesture sensor.
Figure 2B:
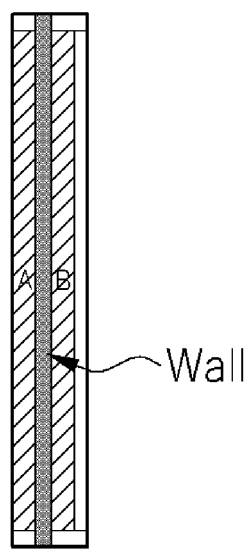
Figure 2C:
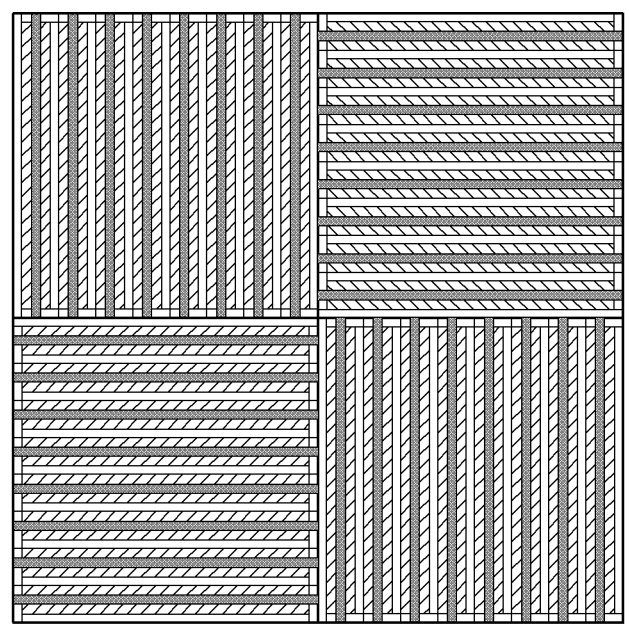

Throughout the drawings and the detailed description, unless otherwise described, the same drawing reference numerals will be understood to refer to the same elements, features, and structures. The relative size and depiction of these elements may be exaggerated for clarity, illustration, and convenience

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

While terms such as "first" and "second," etc., may be used to describe various components, such components must not be understood as being limited to the above terms. The above terms are used only to distinguish one component from another. For example, a first component may be referred to as a second component without departing from the scope of rights of the present disclosure, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "~ between", "immediately ~ between" or "adjacent to ~" and "directly adjacent to ~" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, calculation s, actions, components, parts, or combinations thereof disclosed in the specification, and are not intended to preclude the possibility that one or more other features, numbers, calculation s, actions, components, parts, or combinations thereof may exist or may be added.

In describing the elements of the present disclosure, terms such as first, second, A, B, (a), (b), etc., may be used. Such terms are used for merely discriminating the corresponding elements from other elements and the corresponding elements are not limited in their essence, sequence, or precedence by the terms.

Figure 3:
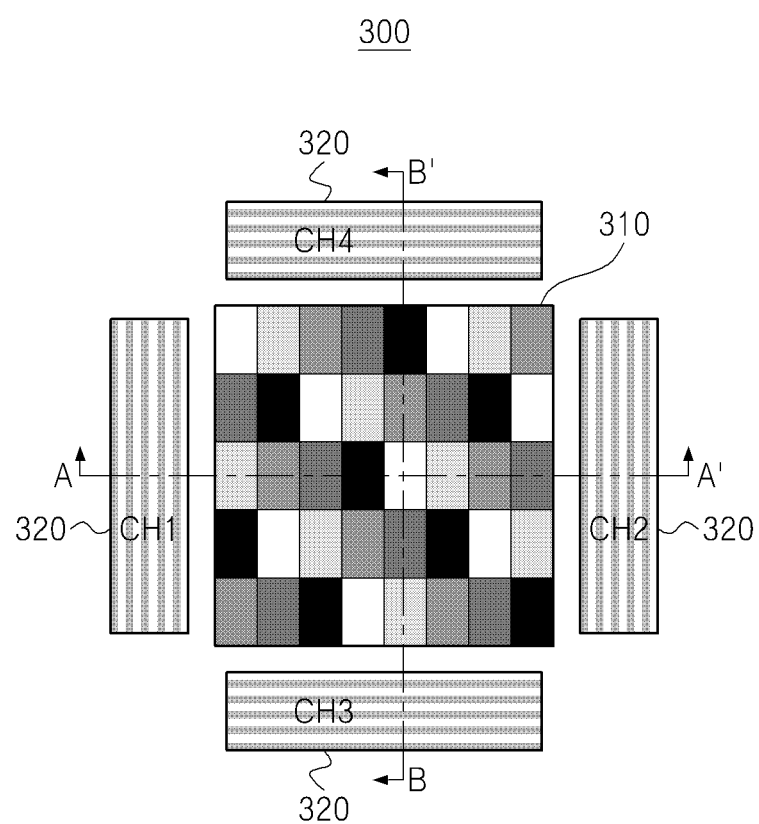
FIG. 3 is a diagram illustrating an example of a gesture sensor.

FIG. 3 is an example of a diagram illustrating a gesture sensor. Referring to FIG. 3, a gesture sensor 300 includes a proximity light sensor 310 and a gesture cell 320.

The proximity light sensor 310 may be arranged at a center of the gesture sensor 300 and may include a plurality of photodiodes to measure an ambient illuminance. An illuminance of a specific wavelength and proximity of a specific object and an optical filter is arranged on the plurality of the photodiodes. The plurality of the photodiodes converts light energy to electric energy. The photodiode includes an optical detection function in a PN junction part and uses a photoelectric effect where an electron and a hole charge is generated and a current flow when a light reaches in a diode. A photovoltaic effect indicates a phenomenon where a voltage is generated on the PN junction part of the photodiode through the photoelectric effect.

The proximity light sensor 310 includes a photodiode array where the plurality of the photodiodes are arranged on a single substrate as a two-dimensional structure. Each of the plurality of the photodiodes may adjoin with each other to be integrally implemented.

Each of the photodiodes may measure a light quantity for a specific component of the light according to the optical filter arranged on the photodiode. The light may be generated from a light source (e.g., a sunlight) located outside of the gesture sensor 300 or may be emitted from a light source (not shown) in the gesture sensor 300 or may be reflected by an external object.

The optical filter includes an infrared blocking filter blocking an infrared ray, an infrared pass filter blocking a visible light and passing the infrared ray and a visible light filter blocking or passing at least visible light. The infrared blocking filter may correspond to a filter blocking an infrared ray of the light and generally block a light corresponding to 780 through 3000 nm of a wavelength. The visible light filter may block all of visible light band of the light or pass a specific wavelength band of the light (e.g., a monochromatic light). Herein, the visible light (commonly referred to simply as light) is electromagnetic radiation that is visible to the human eye, and is responsible for the sense of sight. The visible light is usually defined as having a wavelength in the range of 380 nm to 780 nm. In the monochromatic light, a red light is usually defined as having a wavelength in the range of 610 nm to 700 nm, a green light is usually defined as having a wavelength in the range of 500 nm to 570 nm and a blue light is usually defined as having a wavelength in the range of 450 nm to 500 nm.

The proximity light sensor 310 may include heterogeneous optical filters lattice arranged on the plurality of the photodiodes. The proximity light sensor 310 may include an ambient brightness sensors, color sensors, and proximity sensors arranged as a lattice shapes. The ambient brightness sensors may include a photodiode to measure a light quantity of the visible light. The color sensors may include a photodiode to measure a light quantity of a specific wavelength band (e.g., a red light) and the color filter passes a specific wavelength band of the visible light. The proximity sensors include a photodiode to measure a light quantity of the infrared ray and the infrared pass filter is arranged on the photodiode.

The gesture sensor 300 includes four gesture cells CH1 through CH4 where the four gesture cells are spaced apart from each other based on the proximity light sensor 310. The gesture cells 320 are arranged on a corresponding direction so that the four gesture cells 320 detect an object movement moving to up, down, left and right direction. That is, the gesture sensor 300 includes the four gesture cells 320 arranged as a diamond shape.

The four gesture cells 320 included in the gesture sensor 300 in only one non-exhaustive illustration, and other number and configuration of gesture cells 320 are considered to be well within the scope of the present disclosure. That is, the gesture sensor 300 may include less than or equal to three or more than or equal to five gesture cells 320. Also, the four gesture cells 320 may be arranged toward other directions. These variation may be understood by those skilled in the art.

The gesture cell 320 corresponds to an infrared sensor and the infrared sensor may include the infrared pass filter on the photodiode to measure an infrared ray of an incident light and to detect the object movement based on the measured infrared ray.

The gesture sensor 300 may detect the object movement moving in all directions based on a light quantity, for example, a light quantity of the infrared ray, and a variation of the measured light quantity measured from each of the four gesture cells CH1 through CH4 320 arranged on the gesture sensor 300.

For example, when the object moves from left side to right side, a light quantity (e.g., an intensity of the infrared ray) measured from a first gesture cell CH1 320 arranged on a left side of the gesture sensor 300 is decreased according to the object movement and otherwise, a light quantity (e.g., an intensity of the infrared ray) measured from a second gesture cell CH2 320 arranged on a right side of the gesture sensor 300 is increased. Therefore, the gesture sensor 300 may detect the object movement (i.e., from left side to right side) and a detailed operation procedure for detecting the object movement is known to those skilled in the art.

Hereinafter, a structure of the four gesture cells CH1 through CH4 320 will be described as a non-exhaustive example, however, as described above, other shapes and configuration of the gesture cells 320 are considered to be well within the scope of the present disclosure.

Figure 4A:
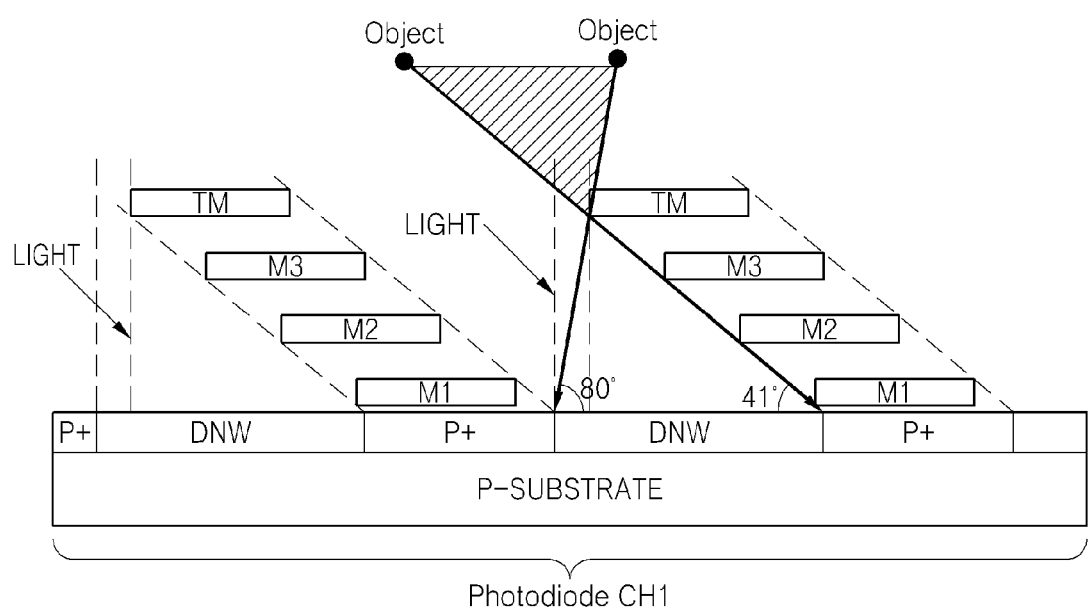
FIGS. 4A through 4C are diagrams illustrating an example of a gesture cell in FIG. 3.
Figure 4B:
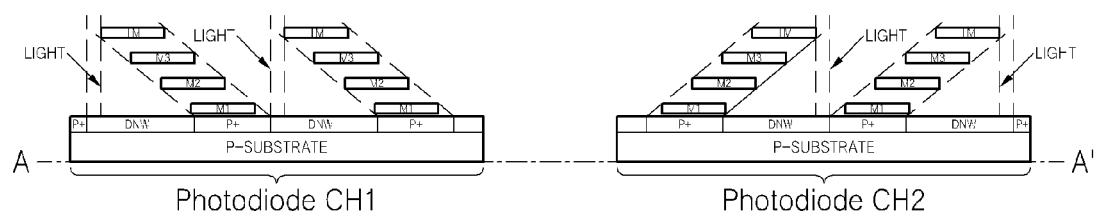
Figure 4C:
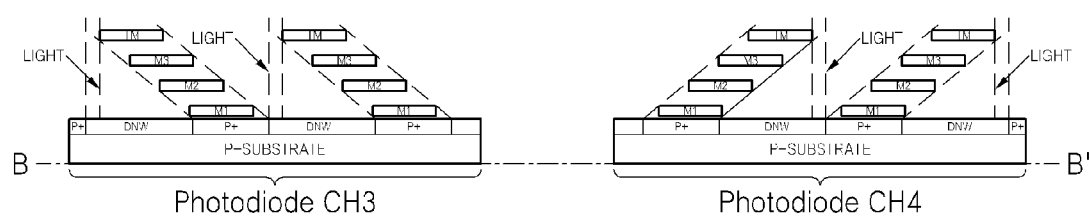

FIGS. 4A through 4C are diagrams illustrating examples of a gesture cell of FIG. 3.

FIG. 4A illustrates an example of a schematic cross sectional diagram of the first gesture cell CH1 320 where the first gesture cell CH1 320 detects the movement of an object from left side to right side. FIG. 4B illustrates an example of a schematic cross sectional diagram of the first and second gesture cells CH1 and CH2 320 based on a section along A-A' of FIG. 3. FIG. 4C illustrates an example of a schematic cross sectional diagram of the third and fourth gesture cells CH3 and CH4 320 based on a section along B-B' of FIG. 3.

As described in FIGS. 4A through 4C, the second gesture cell CH2 320 detects an object movement moving from right side to left side. The second gesture cell CH2 320 may be derived by an anticlockwise rotation of the first gesture cell CH1 to 180 degree. The third gesture cell CH3 320 detects an object movement moving from down side to up side. The third gesture cell CH3 320 may be derived by an anticlockwise rotation of the first gesture cell CH1 to 90 degree. The fourth gesture cell CH4 320 detects an object movement moving from up side to down side. The fourth gesture cell CH4 320 may be derived by an anticlockwise rotation of the second gesture cell CH2 320 to a 90 degree. Referring to FIG. 4A, each of the four gesture cells 320 include a photodiode and an optical blind. The photodiode includes two layers (P+) and Deep N well (DNW) arranged on a substrate (P-substrate). The first layer (DNW) corresponds to a cathode of a PN diode and the second layer (P+ or P+ diffusion) corresponds to an anode of the PN diode.

As described above, when a negative voltage is applied to the P layer, the photodiode may measure a distance and movement of the object based on a current variation changed according to a light quantity thereon.

The optical blind is arranged on the photodiode to determine or limit an incident angle of the light source for the photodiode. The optical blind may be layered on the photodiode obliquely toward the first direction (e.g., the left side) to guide the light being incident from the first direction to the photodiode.

In a non-exhaustive example the optical blind may include a plurality of metal layers that are spaced apart and are laid obliquely to determine the incident angle of the light source. The optical blind forms a structure that is laid toward a specific direction from a bottom metal layer to a top metal layer so that an incident light reflected from the object is guided to the photodiode. The plurality of the metal layers may not be directly connected and may be spaced apart from each other.

Referring to FIG. 4A, in the first gesture cell CH1, the first metal layer M1 is arranged on P+ layer and the second metal layer M2 is laid on the first metal layer M1 obliquely toward a left side in order to limit the incident angle of the light source to a left direction. A fourth metal layer (TM, i.e., Top Metal layer) is arranged on a third metal layer M3, and the third metal layer M3 is laid on a lower metal layer obliquely toward a left side. Therefore, a light that is incident from a left direction may reach the photodiode.

The optical blind may be obliquely arranged with a slope such that the gesture cell may detect the movement of an object movement in a range based on the gesture sensor. For example, the optical blind may be arranged such that a light reflected from an object being located at a 41 degree through a 100 degree with respect to a detection direction is guided toward a photodiode.

In one non-exhaustive example, the optical blind is obliquely arranged so that the optical blind covers at most three fourths (75%) of the area for the first layer DNW. When the light is vertically incident on the substrate, at least one fourth (25%) of the area for the first layer DNW may be exposed to the light, based on the obliquely arranged optical blind.

When the gesture sensor 300 includes the four gesture cells 320, CH1 through CH4, and the exposed area of the first layer corresponds to one fourth (25%) of the area of the first layer, the gesture sensor 300 may calculate a distance of a corresponding object through only a plus calculation for the light quantity measured from the four gesture cells (i.e., ¼*4=1) without an additional calculation.

In one non-exhaustive example, the plurality of the metal layers may form a single plane and may be independent from each other. Therefore, the optical blind may not include a VIA, which is used to connect the plurality of the metal layers in conventional techniques. The plurality of the metal layers may be spaced apart from each other through a specific shape, as described in FIGS. 5A through 5C, without the VIA. The VIA corresponds to a component used for an electrical connection between the plurality of the metal layers.

The characteristics of the gesture sensor described above has several examples. First, a manufacturing procedure of the gesture sensor may be simplified. The conventional gesture cell arranges a plurality of metal layers (e.g., eight metal layers) being spaced apart from each other on the same plane of a single gesture cell and a plurality of metal layers (e.g., four metal layers) alternately lay the corresponding VIA on each of a plurality of metal layers (i.e., 8 metal layers*(4 level+3 VIAS)=56 times arrangements). On the other hands, a single gesture cell may lay a plurality of metal layers (e.g., four metal layers) forming a single plane through the specific shape so that the manufacturing procedure of the gesture sensor may be simplified (e.g., from 56 times to 4 times).

Second, a reflectance of light being inputted outside by the plurality of the metal layers may be improved through improving a flatness of a surface of the plurality of the metal layers to remove optical noise. For example, when the VIA exists between the plurality of the metal layers, a bend of the surface of the plurality of the metal layers may be generated by a weight or volume of the VIA. This bend causes a diffused reflection from the incident light to generate the optical noise, where the optical noise is not an intended influences to the photodiode. When the gesture cell may be spaced apart from each other to lay the plurality of the metal layers without the VIA, the flatness of the surface of the plurality of the metal layers may be improved and a generation of the optical noise may be prevented.

Third, the optical noise may be removed. For example, the optical noise is incident to the photodiode and is reflected to a surface of the photodiode or the plurality of the metal layers to be incident between the optical blind. When the VIA exist, the optical noise is reflected by the VIA and the optical noise that is incident on the photodiode increase. In the absence of the VIA, the optical noise is reflected outside through between the optical blind and the plurality of the metal layers to be removed.

Referring to FIG. 4B, in the second gesture cell CH2, the first metal layer M1 is arranged on the first layer P+ or P+ diffusion and the second gesture cell CH2 includes the second metal layer M2 obliquely laid on the first metal layer M1 toward right side in order to limit the incident angle of the light source to a right direction like in FIG. 4A. The third metal layer M3 and the fourth metal layer (TM, i.e., Top Metal layer) are obliquely laid on a metal layer arranged on a lower of the first gesture cell CH1 toward the right side. Therefore, a light that is incident from a right direction may reach the photodiode.

Referring to FIG. 4C, structures of the third and fourth gesture cells CH3 and CH4 320 are same as the structures of the first and second gesture cells CH1 and CH2 320 and are anticlockwise arranged on a rotation of 90 degree. Thus, each of the third and fourth gesture cells CH3 and CH4 320 may measure a light that is incident from a upper side and a lower side of the photodiode.

Figure 5A:
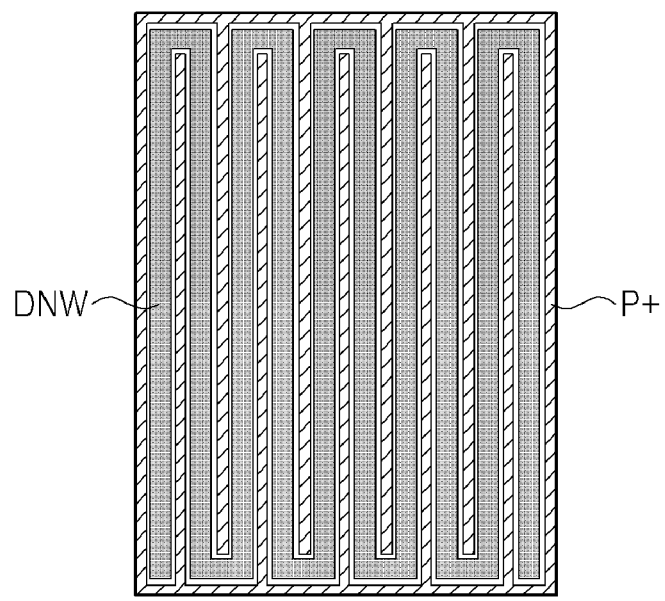
FIGS. 5A through 5C are diagrams illustrating examples of a gesture cell in FIG. 3.
Figure 5B:
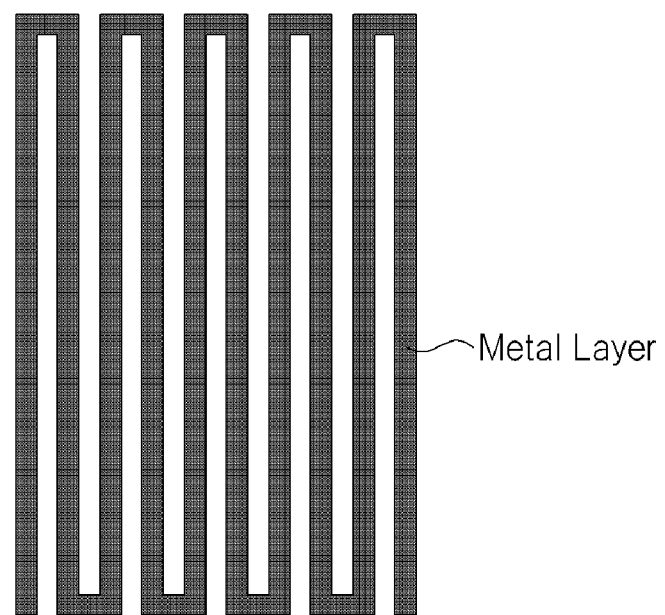
Figure 5C:
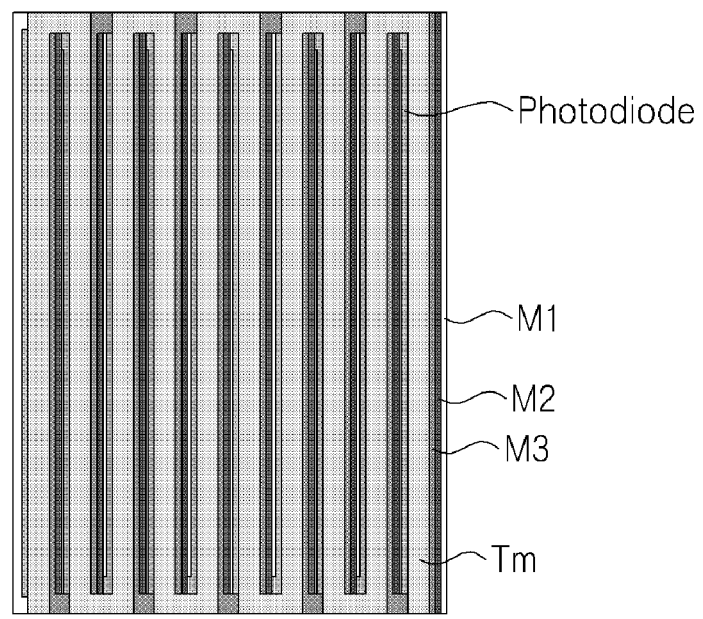

FIGS. 5A through 5C are sectional diagrams illustrating examples of a gesture cell in FIG. 3. Referring to FIG. 5A, the gesture cell 320 includes a single photodiode including a first layer DNW and the first layer proceeds in a zigzag manner toward a first direction (a horizontal direction i.e., left direction or right direction) on a substrate. In other words, the first layer is formed as a serpentine element on a substrate. The serpentine element is continuously formed from multiple limbs positioned in the first directions and returning in a corresponding second direction. Each limb positioned in the first direction and the corresponding limb returning in the second direction are equally spaced apart.

The first layer DNW is arranged in winding shape from an lower left side to a lower right side. The photodiode includes the second layer P+, which is arranged in a space remaining after arranging the first layer DNW.

The gesture cell 320 includes a single type photodiode not an integrated type photodiode having a plurality of unit cell. The gesture cell 320 may resolve a noise current being generated in conventional gesture cell and the structure of the gesture cell may be simplified.

The gesture cell 320 includes an optical blind being layered on the photodiode obliquely toward the first direction (a horizontal direction i.e., left direction or right direction) to guide the first direction incident light to the photodiode. The plurality of the metal layers may be obliquely laid to implement the optical blind.

In one embodiment, the plurality of the metal layers may move toward the first direction (e.g., being laid toward the left direction), each forming a plane.

Referring to FIG. 5B, each of the plurality of the metal layers may be arranged as a zigzag toward the first direction (e.g., toward the left direction) similar to the first layer arranged on the photodiode.

Referring to FIG. 5C, a plurality of the metal layers Tm, M1, M2, and M3 are shown disposed on a photodiode. M1 is disposed on the P+ layer and the second metal layer M2 is laid on the first metal layer M1 obliquely toward a left side. A third metal is laid on the second metal layer M2 obliquely toward a left side. The Top Metal layer TM is arranged on a third metal layer M3 obliquely toward a left side.

In one example, a length of the plurality of the metal layers is longer than a length of the first layer so that the plurality of the metal layers overlaps with a minimum area of the first layer. For example, the plurality of the metal layers may form a length of the second layer (i.e., vertical length) enclosing the first layer. Therefore, the plurality of the metal layers may be overlapped with a minimum area of the first layer to increase a sensing efficiency through the photodiode.

The plurality of the metal layers forming the optical blind may be implemented as a single type similar to the photodiode. Thus, the optical blind may not require additional VIA between the plurality of the metal layers. The optical blind may fix a part of the plurality of the metal layers (e.g., an edge part) to be spaced apart from each other. Therefore, the VIA used for a conventional gesture cell may be removed. The advantages of removing the VIA are described above.

The gesture sensor 300 may include a plurality of gesture cells 320 and the plurality of the gesture cells may be vertically arranged to detect the movement of an object.

In one non-exhaustive example, the plurality of the gesture cells may include a first gesture cell that is arranged on a left side at center of the gesture sensor and the first gesture cell including the photodiode and a left-directed optical blind. A second gesture cell being arranged on a right side at center of the gesture sensor and the second gesture cell including the photodiode and a right-directed optical blind. A third gesture cell being arranged on a lower side at center of the gesture sensor and the third gesture cell including the photodiode and a lower-directed optical blind. A fourth gesture cell being arranged on a upper side at center of the gesture sensor and the second gesture cell including the photodiode and an upper-directed optical blind.

Figure 6A:
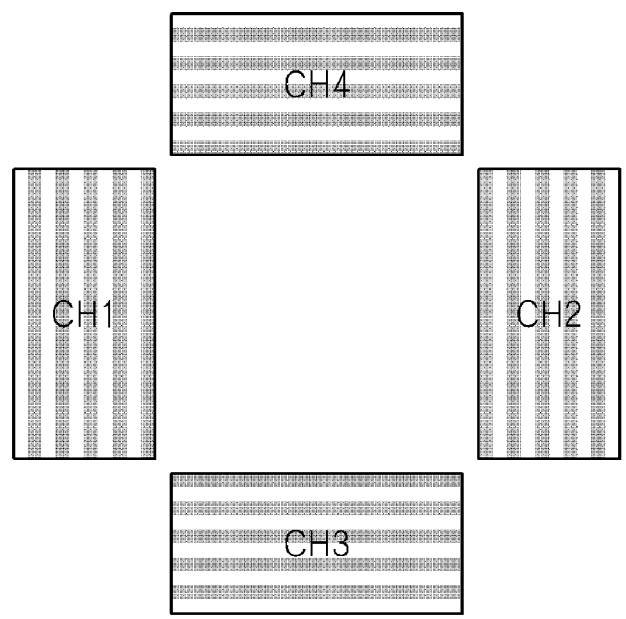
FIGS. 6A and 6B are diagrams illustrating examples of a disposition of a gesture sensor in FIG. 3.
Figure 6B:
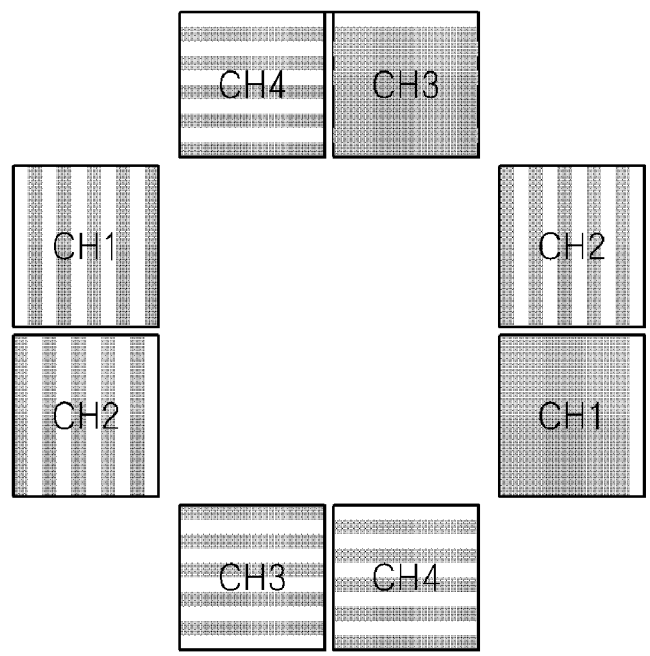

FIGS. 6A and 6B are diagrams illustrating examples of a disposition of a gesture sensor shown in FIG. 3.

Referring to FIG. 6A, the gesture sensor includes four first gesture cells arranged as a type enclosing a quadrangular space. The first gesture cell CH1 detecting an object movement moving from a left side to right side is arranged on a left side of a point, which is located at a center of a diagram. The second gesture cell CH2 detecting an object movement moving from a right side to left side is arranged on a right side of the point. The third gesture cell CH3 detects an object movement moving from lower side to upper side and the fourth gesture cell CH4 detects an object movement moving from upper side to lower side. The third gesture cell CH3 and the fourth gesture cell CH4 are arranged on a top and bottom of the point, respectively. The first gesture cell CH1 includes the photodiode and a left-directed optical blind, and the second gesture cell CH2 includes the photodiode and a right-directed optical blind. The third gesture cell CH3 includes the photodiode and a lower-directed optical blind and the fourth gesture cell CH4 includes the photodiode and an upper-directed optical blind. As described each of the second through fourth gesture cells CH2 through CH4 can be arranged by anticlockwise and sequentially rotating the first gesture cell CH1 to 90 degree.

As shown in FIG. 6A, the gesture sensor may instantly detect an object movement in four directions and may arrange the proximity light sensors, i.e., the ambient illuminance sensor, the color sensor, and the proximity sensor (not shown) on the empty space enclosed by the gesture sensor to provide a maximum efficiency of each of the sensors.

In one example, each of the four first cells may further include another gesture cells and each being a pair with one of the first through fourth gesture cells to detect, if visible, an opposite movement of the object.

The gesture sensor may further include a fifth gesture cell, a sixth gesture cell, a seventh gesture cell, and an eighth gesture cell. The fifth gesture cell may adjoin a lower side of the first gesture cell CH1 and the fifth gesture cell includes a photodiode and a right-directed optical blind. The sixth gesture cell may adjoin a lower side of the second gesture cell CH2 and the sixth gesture cell includes a photodiode and a left-directed optical blind. The seventh gesture cell may adjoin a right side of the third gesture cell CH3 and the seventh gesture cell includes a photodiode and an upper-directed optical blind. The eighth gesture cell may adjoin a right side of the fourth gesture cell CH4 and the eighth gesture cell includes a photodiode and a lower-directed optical blind.

Referring to FIG. 6B, in comparison with FIG. 6A, an area for each of the gesture cells is decreased by half so that the gesture cells detecting the movement of the object moving to a corresponding cell and the opposite direction are respectively arranged on a generated space by the decreased area of the gesture cells.

On the left hand side, the first gesture cell CH1 is arranged on the upper left side and another gesture cell CH2 is arranged on the lower left side. On the right hand side, the second gesture cell CH2 is arranged on upper right side and another gesture cell CH1 is arranged on lower right side. The third and fourth gesture cells CH3 and CH4 are each arranged toward the upper and lower directions divide a corresponding space.

The gesture sensor may obtain information for the object movement through the uniformly arranged gesture cells to increase the sensing efficiency. When a cell of a specific position (e.g., an upper side) is operated in order to decrease power consumption, the cell of a specific position may instantly detect the object movement in an corresponding part (e.g., a upper part) and the opposite part (e.g., a lower part).

In one example, the plurality of the gesture cells may include first and second pair gesture cells respectively detecting an object movement, the object moving toward a first direction or a first opposite direction and first and second gesture cells adjoining at the first direction to be arranged and third and fourth gesture cells respectively detecting an object movement, the object moving toward a second direction perpendicular to the first direction and a second opposite direction and the third and fourth gesture cells adjoining the first and second gesture cells at the second direction to be arranged.

Figure 7A:
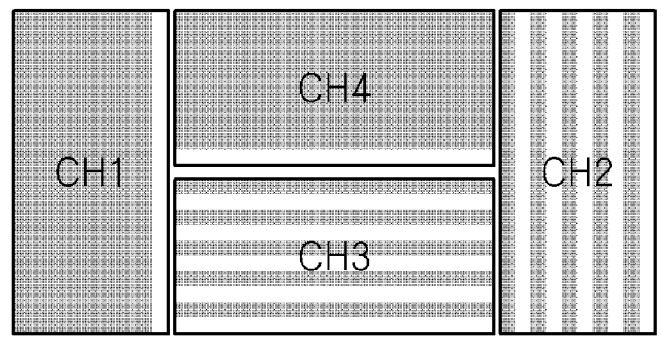
FIGS. 7A through 7D are diagrams illustrating examples of a disposition of a gesture sensor in FIG. 3.

FIGS. 7A through 7D are diagrams illustrating examples of disposition of a gesture sensor in FIG. 3. Referring to FIG. 7A, the third and fourth pair gesture cells CH3 and CH4 detect the object moving upwards and downwards. The third and fourth pair gesture cells CH3 and CH4 adjoin each other to be arranged as top and bottom sides, respectively. The first and second gesture cells CH1 and CH2 detect the object moving toward left and right side. The first and second gesture cells CH1 and CH2 are arranged to left and right sides, respectively, of the third and fourth gesture cells CH3 and CH4.

Figure 7B:
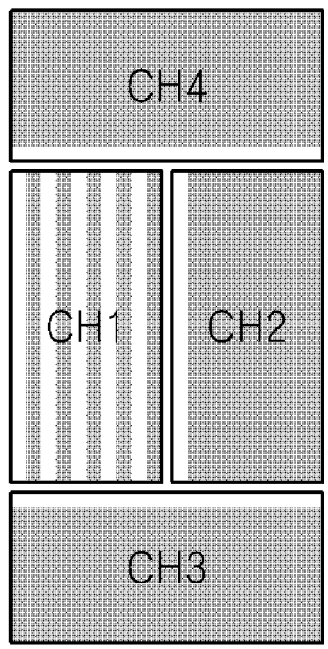

Referring to FIG. 7B, the first and second gesture cells CH1 and CH2 adjoin each other to be arranged to left and right sides. The third and fourth gesture cells CH3 and CH4 are arranged on the bottom and top, respectively, of the first and second gesture cells CH1 and CH2. The gesture sensor described in FIG. 7B may result from an anticlockwise rotation of the gesture sensor described in FIG. 7A. Advantages using a space of the gesture sensor may be increased.

In another example, each of the first through fourth gesture cells may further include fifth through eighth gesture cells. The fifth through eighth gesture cells may detect an object movement moving to an opposite direction with the corresponding gesture cell and may be paired with the corresponding gesture cell to be arranged to a corresponding direction.

Figure 7C:
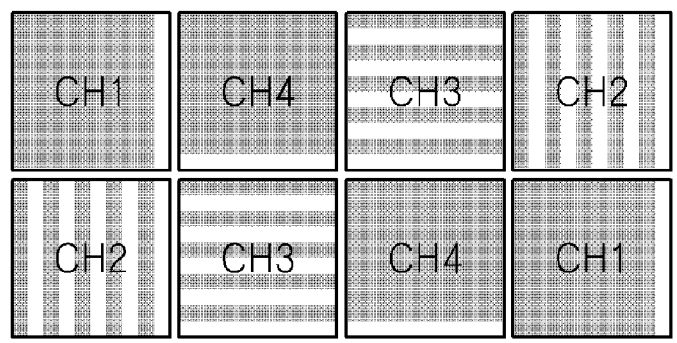

In FIG. 7C, the gesture sensor divides a space for a corresponding gesture cell to pair a corresponding cell and a counterpart gesture cell. The counterpart gesture cell detects an object movement moving toward an opposite direction of the corresponding cell. This is described in FIG. 6B and FIG. 7A. The first and fifth gesture cells are arranged on the space assigned to the first gesture cell described in FIG. 7A. The sixth through eighth gesture cells is respectively paired with the second through fourth gesture cells.

The gesture sensor may further include the fifth gesture cell arranged on a lower side of the first gesture cell and the fifth gesture cell includes the photodiode and a right-directed optical blind. The sixth gesture cell is arranged on a lower side of the second gesture cell and the sixth gesture cell including the photodiode and a left-directed optical blind. The seventh gesture cell is arranged on a right side of the third gesture cell and the seventh gesture includes the photodiode and an upper-directed optical blind. The eighth gesture cell is arranged on a right side of the fourth gesture cell and the eighth gesture cell includes the photodiode and a lower-directed optical blind. The gesture cells for detecting an object movement toward a same direction is independently arranged at a diagonal direction with each other.

Figure 7D:
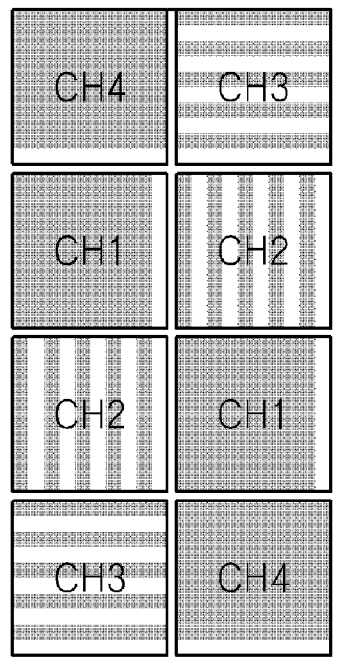

Referring to FIG. 7D, the fifth through eighth gesture cells is paired with the first through fourth gesture cells similar to FIG. 7C. The gesture sensor described in FIG. 7(d) may result from a counterclockwise rotation of the gesture sensor described in FIG. 7C. The gesture sensor may uniformly receive information for the object movement.

In FIG. 7C and FIG. 7D, the gesture sensor includes a first gesture cell group including a plurality of gesture cells CH1 through CH4 adjoining each other. The first gesture cell group includes the first gesture cell CH1 through the fourth gesture cell CH4. In FIG. 7C, the first gesture cell CH1 is arranged on an upper left side and detects a left direction moving object. The second gesture cell CH2 is arranged on a lower left side and detects an object movement for the right direction. The third gesture cell CH3 is arranged on a lower right side and detects an object movement for the lower direction. The fourth gesture cell CH4 is arranged on an upper right side and detects an object movement for the upper direction.

The first through four gesture cells CH1 through CH4 in a specific area may be defined as a single gesture cell group and the gesture sensor may include a plurality of gesture cell groups being rotated to a different angle to be arranged on the up, down, left, and right sides.

The gesture sensor may further include a second gesture cell group adjoining a left or right side of the first gesture cell group. The second gesture cell group may be obtained by rotating the first gesture cell group anticlockwise to 180 degree.

An arrangement of the gesture cells in the gesture cell group may be changed according to an product and this change may be apparent to one of ordinary skill in the art.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

DESCRIPTION OF SYMBOLS

100: CONVENTIONAL GESTURE SENSOR
300: GESTURE SENSOR
310: PROXIMITY LIGHT SENSOR
320: GESTURE CELL

What is claimed is:

1. A gesture cell comprising:
a photodiode comprising a first layer, the first layer formed as a serpentine element on a substrate; and
an optical blind configured to guide a light that is incident from a first direction on the photodiode, the optical blind being placed on the photodiode obliquely toward the first direction,
wherein the serpentine element is continuously formed from multiple limbs positioned in the first directions and returning in a corresponding second direction, and each limb positioned in the first direction and the corresponding limb returning in the second direction are equally spaced apart.

2. The gesture cell of claim 1, wherein the optical blind comprises metal layers laid on top of each other in a staggered manner and the metal layers being spaced apart from each other.

3. The gesture cell of claim 2, wherein each of the metal layers is continuously formed from multiple members positioned in the first directions and returning in a corresponding second direction, and each member positioned in the first direction and the corresponding member returning in the second direction are equally spaced apart forming a plane.

4. The gesture cell of claim 3, wherein the metal layers are independent from each other.

5. The gesture cell of claim 1, wherein the optical blind is obliquely arranged so that the optical blind covers not more than three fourths (75%) of an upper area of the first layer.

6. The gesture cell of claim 2, wherein a via layer is absent from the metal layers.

7. The gesture cell of claim 1, wherein the first layer comprises at least a P+ layer and a Deep N Well (DNW) layer.

8. A gesture sensor comprising:
a plurality of gesture cells disposed on a surface to detect a movement of an object;
wherein each gesture cell of the plurality of the gesture cells comprises:
a photodiode comprising a first layer, the first layer formed as a serpentine element on a substrate; and
an optical blind configured to guide a light that is incident from a first direction on the photodiode, the optical blind being placed on the photodiode obliquely toward the first direction, and
the serpentine element is continuously formed from multiple limbs positioned in the first directions and returning in a corresponding second direction, and each limb positioned in the first direction and the corresponding limb returning in the second direction are equally spaced apart.

9. The gesture sensor of claim 8, wherein the plurality of the gesture cells comprises four gesture cells, each gesture cell being disposed toward a respective first direction to detect movement of an object in the respective first direction.

10. The gesture sensor of claim 9, wherein the four gesture cells comprise:
a first gesture cell arranged on a center left side of the gesture sensor and the first gesture cell comprising the photodiode and a left-directed optical blind;
a second gesture cell being arranged on a center right side of the gesture sensor and the second gesture cell comprising the photodiode and a right-directed optical blind;
a third gesture cell being arranged on a lower center side of the gesture sensor and the third gesture cell comprising the photodiode and a lower-directed optical blind; and
a fourth gesture cell being arranged on a upper center side of the gesture sensor and the fourth gesture cell comprising the photodiode and an upper-directed optical blind.

11. The gesture sensor of claim 9, further comprising four additional gesture cells, each additional gesture cell corresponding to one of the first through fourth gesture cells and each additional gesture cell configured to detect a movement of the object in a direction opposite to the respective first direction of the corresponding gesture cell.

12. The gesture sensor of claim 10, further comprising:
a fifth gesture cell disposed below the first gesture cell and the fifth gesture cell comprising the photodiode and a right-directed optical blind;
a sixth gesture cell disposed below the second gesture cell and the sixth gesture cell comprising the photodiode and a left-directed optical blind;
a seventh gesture cell disposed below the third gesture cell and the seventh gesture cell comprising the photodiode and an upper-directed optical blind; and
an eighth gesture cell disposed below the fourth gesture cell and the eighth gesture cell comprising the photodiode and a lower-directed optical blind.

13. The gesture sensor of claim 8, wherein the plurality of the gesture cells comprises:
a first and a second gesture cell disposed in opposite respective first directions to detect movements of an object in the opposite respective first directions; and
a third and a fourth gesture cells disposed in opposite respective first directions to detect movements of an object in the opposite respective first directions,
wherein the opposite respective first directions of the first and second gesture cells are perpendicular to the opposite respective first directions of the third and fourth gesture cells.

14. The gesture sensor of claim 13, wherein:
the first gesture cell is arranged on a center left side of the gesture sensor and the first gesture cell comprises the photodiode and a first left-directed optical blind;
the second gesture cell is arranged on a center right side of the gesture sensor and the second gesture cell comprises the photodiode and a first right-directed optical blind;
the third and fourth adjoining gesture cells are arranged between the first and second gesture cells, each including the photodiode;
the third gesture cell further comprises a first lower-directed optical blind; and
the fourth gesture cell further comprises a first upper-directed optical blind.

15. The gesture sensor of claim 13, wherein the first through fourth gesture cells form pairs with adjoining fifth through eighth gesture cells, respectively, each pair configured to detect movement in two opposite directions.

16. The gesture sensor of claim 14, further comprising:
a fifth gesture cell disposed below the first gesture cell and the fifth gesture cell comprising the photodiode and a second right-directed optical blind;
a sixth gesture cell disposed below the second gesture cell and the sixth gesture cell comprising the photodiode and a second left-directed optical blind;
a seventh gesture cell arranged on a right side of the third gesture cell and the seventh gesture cell comprising the photodiode and a second upper-directed optical blind; and
an eighth gesture cell arranged on a right side of the fourth gesture cell and the eighth gesture cell comprising the photodiode and a second lower-directed optical blind,
wherein gesture cells diagonal to each other are configured to detect movement of the object in a same direction.

17. The gesture sensor of claim 14, wherein the gesture sensor is rotated counterclockwise to 90 degrees.

18. A gesture sensor comprising:
a light sensor; and
a first gesture cell, a second gesture cell, a third gesture cell, and a fourth gesture cell disposed around the light sensor to detect a movement of an object, wherein: the first gesture cell is arranged on a center left side of the light sensor and the first gesture cell comprises a left-directed optical blind;
the second gesture cell is arranged on a center right side of the light sensor and the second gesture cell comprises a right-directed optical blind;
the third gesture cell is arranged on a lower center side of the light sensor and the third gesture cell comprises a lower-directed optical blind; and
the fourth gesture cell is arranged on an upper center side of the light sensor and the fourth gesture cell comprises an upper-directed optical blind,
wherein the gesture sensor is configured to detect the movement of the object in the left-directed, right-directed, lower-directed, and upper-directed directions,
each optical blind is directed according to a first direction in which layers of the optical blind are obliquely stacked, and
each gesture cell comprises a photodiode having a first layer formed as a serpentine element on a substrate.

19. The gesture sensor of claim 18,
wherein the optical blind of each gesture cell is configured to guide a light that is incident from the first direction onto the photodiode; and
the serpentine element is continuously formed from multiple limbs positioned in the first direction and returning in a corresponding second direction, and each limb positioned in the first direction and the corresponding limb returning in the second direction are equally spaced apart.

* * * * *